(12) United States Patent
Kincaid et al.

(10) Patent No.: US 9,126,502 B2
(45) Date of Patent: Sep. 8, 2015

(54) DUAL ELECTRODE OCCUPANT DETECTION SYSTEM AND METHOD

(75) Inventors: Kevin D. Kincaid, Kokomo, IN (US);
Duane D. Fortune, Lebanon, IN (US);
Morgan D. Murphy, Kokomo, IN (US);
Robert K. Constable, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 558 days.

(21) Appl. No.: 13/585,200

(22) Filed: Aug. 14, 2012

(65) Prior Publication Data
US 2014/0049272 A1    Feb. 20, 2014

(51) Int. Cl.
*G01R 27/26*    (2006.01)
*B60N 2/00*    (2006.01)
*B60R 21/015*    (2006.01)

(52) U.S. Cl.
CPC ........... *B60N 2/002* (2013.01); *B60R 21/0154* (2014.10); *B60R 21/01532* (2014.10)

(58) Field of Classification Search
CPC ..................................... G01R 27/26
USPC ........... 324/658–690; 345/173–176; 280/735; 701/45; 340/686.6
See application file for complete search history.

(56) References Cited

U.S. PATENT DOCUMENTS

| | | | |
|---|---|---|---|
| 5,411,289 A * | 5/1995 | Smith et al. | 280/735 |
| 5,914,610 A | 6/1999 | Gershenfeld et al. | |
| 6,161,070 A | 12/2000 | Jinno et al. | |
| 6,179,378 B1 | 1/2001 | Baumgartner et al. | |
| 6,378,900 B1 * | 4/2002 | Stanley et al. | 280/735 |
| 6,392,542 B1 * | 5/2002 | Stanley | 340/561 |
| 6,546,822 B1 * | 4/2003 | Tahara et al. | 73/862.41 |
| 6,556,137 B1 | 4/2003 | Oka et al. | |
| 6,559,555 B1 | 5/2003 | Saitou et al. | |
| 6,644,689 B2 | 11/2003 | Murphy | |
| 6,696,948 B2 | 2/2004 | Thompson et al. | |
| 6,816,077 B1 | 11/2004 | Shieh et al. | |
| 6,877,606 B2 | 4/2005 | Hardy | |
| 6,906,534 B2 * | 6/2005 | Hoisington et al. | 324/694 |
| 6,960,841 B2 | 11/2005 | Saitou et al. | |
| 7,048,338 B2 | 5/2006 | Pinkos | |

(Continued)

FOREIGN PATENT DOCUMENTS

| | | | |
|---|---|---|---|
| JP | 2007-126141 | * | 5/2007 |
| JP | 2007126141 | * | 5/2007 |
| WO | WO9513204 | | 5/1995 |

OTHER PUBLICATIONS

Jinno et al., "Vehicle Occupant Sensing Device and Its Method", JP2007-126141, Machine Translation, 2007, p. 1-15.*

(Continued)

*Primary Examiner* — Patrick Assouad
*Assistant Examiner* — Lamarr Brown
(74) *Attorney, Agent, or Firm* — Lawrence D. Hazelton

(57) ABSTRACT

A dual-electrode occupant detection system configured to determine an occupant presence on a seat assembly. The system includes two electrodes that each generates an electric field in response to an applied excitation signal. The two electrode signals arising therefrom can be measured individually and/or combined to detect more reliably an occupant. Such a configuration advantageously avoids the added expense and complication of an electrode arrangement that relies on an underlying shield layer to reduce electrode signal degradation caused by a seat heater element.

16 Claims, 5 Drawing Sheets

(56) References Cited

U.S. PATENT DOCUMENTS

| | | | |
|---|---|---|---|
| 7,084,763 B2 | 8/2006 | Shieh et al. | |
| 7,102,527 B2 | 9/2006 | Shieh et al. | |
| 7,151,452 B2 | 12/2006 | Shieh | |
| 7,194,346 B2 | 3/2007 | Griffin et al. | |
| 7,701,338 B2 * | 4/2010 | Kamizono et al. | 340/561 |
| 7,880,480 B2 | 2/2011 | Hansen et al. | |
| 8,091,960 B2 | 1/2012 | Kincaid et al. | |
| 8,154,394 B2 | 4/2012 | Hansen | |
| 8,417,516 B2 * | 4/2013 | Choo et al. | 704/219 |
| 2001/0045733 A1 * | 11/2001 | Stanley et al. | 280/735 |
| 2003/0094959 A1 * | 5/2003 | Hoisington et al. | 324/694 |
| 2004/0111201 A1 | 6/2004 | Thompson et al. | |
| 2005/0134442 A1 * | 6/2005 | Fultz et al. | 340/438 |
| 2005/0253712 A1 | 11/2005 | Kimura et al. | |
| 2006/0187038 A1 | 8/2006 | Shieh et al. | |
| 2008/0116725 A1 * | 5/2008 | Hawes et al. | 297/217.3 |
| 2009/0079443 A1 * | 3/2009 | Ogata et al. | 324/671 |
| 2009/0267622 A1 * | 10/2009 | Hansen et al. | 324/684 |
| 2009/0271076 A1 | 10/2009 | Griffin | |
| 2009/0295199 A1 * | 12/2009 | Kincaid et al. | 297/180.12 |
| 2009/0295411 A1 * | 12/2009 | Hansen | 324/681 |
| 2011/0006788 A1 * | 1/2011 | Kim et al. | 324/661 |
| 2011/0140891 A1 * | 6/2011 | Fortune et al. | 340/541 |
| 2011/0163767 A1 * | 7/2011 | Chen et al. | 324/679 |
| 2011/0163878 A1 * | 7/2011 | Gray et al. | 340/562 |
| 2011/0190980 A1 * | 8/2011 | Kincaid | 701/36 |
| 2011/0190987 A1 * | 8/2011 | Kincaid et al. | 701/45 |
| 2011/0221453 A1 * | 9/2011 | Hwang et al. | 324/661 |
| 2011/0241895 A1 * | 10/2011 | Griffin | 340/686.1 |
| 2011/0270491 A1 * | 11/2011 | Kincaid et al. | 701/45 |
| 2011/0285408 A1 * | 11/2011 | Satake et al. | 324/679 |
| 2012/0065845 A1 * | 3/2012 | Satake et al. | 701/47 |
| 2012/0123985 A1 * | 5/2012 | Kwon et al. | 706/45 |
| 2012/0146668 A1 * | 6/2012 | Satake et al. | 324/662 |
| 2013/0015866 A1 * | 1/2013 | Wendt et al. | 324/679 |
| 2013/0127211 A1 * | 5/2013 | Aoki | 297/180.12 |

OTHER PUBLICATIONS

European Search Report dated Oct. 29, 2013.

* cited by examiner

DUAL ELECTRODE OCCUPANT DETECTION SYSTEM AND METHOD

TECHNICAL FIELD OF INVENTION

This disclosure generally relates to occupant detection systems that determine occupant presence using an electric field, and more particularly relates to applying high and low frequency excitation signals to various combinations of two electrodes configured to radiate the electric field.

BACKGROUND OF INVENTION

Occupant detection systems that use an electrode located proximate to a seating surface to radiate an electric field and thereby detect occupant presence are known; see U.S. Pat. No. 7,876,106 issued to Hansen et al. Jan. 25, 2011. However, environmental conditions, such as humidity and moisture, may interfere with the occupant detection system's readings. For instance, humidity or moisture may cause reduced distinction or separation between 'Allow airbag deployment' and 'Inhibit airbag deployment' signal outputs required for an occupant detection system to meet the Federal Motor Vehicle Safety Standards 208 (FMVSS208). For example, some children or car seats could be mischaracterized as adults by an inadequate occupant detection system. For applications with a seat-heater present in the seat, driven shield layers may be required to increased separation between the 'Allow' and 'Inhibit' conditions. It has been suggested to add a separate humidity sensor to the system in order for the system to be able to determine humidity level and compensate accordingly. Unfortunately, such additional sensors undesirably increase the cost of the system.

SUMMARY OF THE INVENTION

In accordance with one embodiment, a dual electrode occupant detection system is provided. The dual electrode occupant detection system is configured to determine an occupant presence on a seat assembly. The dual electrode occupant detection system includes a first electrode, a second electrode, and a controller. The first electrode is configured to be installed into a seat assembly proximate to a seating surface of the seat assembly. The first electrode is configured to generate an electrode signal having a signal value dependent on an excitation signal applied to the first electrode and a proximity of the occupant. The second electrode is distinct from the first electrode. The second electrode is configured to be installed into the seat assembly and is configured to generate an electrode signal having a signal value dependent on an excitation signal applied to the second electrode and the proximity of the occupant. The controller is configured to determine an occupant presence based on signal values arising from a high frequency excitation signal and a low frequency excitation signal being applied to two or more of a) only the first electrode, b) only the second electrode, and c) simultaneously both the first electrode and the second electrode.

In another embodiment, a method of detecting an occupant presence on a seat assembly is provided. The method includes the step of providing a first electrode configured to be installed into a seat assembly proximate to a seating surface of the seat assembly and configured to generate an electrode signal having a signal value dependent on an excitation signal applied to the first electrode and a proximity of the occupant. The method also includes the step of providing a second electrode distinct from the first electrode. The second electrode is configured to be installed into the seat assembly and is configured to generate an electrode signal having a signal value dependent on an excitation signal applied to the second electrode and the proximity of the occupant. The method also includes the step of applying a high frequency excitation signal and a low frequency excitation signal, selectively, to two or more of a) only the first electrode, b) only the second electrode, and c) simultaneously both the first electrode and the second electrode. The method also includes the step of determining an occupant presence based on signal values arising from the excitation signals being applied to the electrodes.

In yet another embodiment, a controller for a dual-electrode occupant detection system is provided. The controller is configured to determine an occupant presence on a seat assembly. The system includes a first electrode configured to be installed into a seat assembly proximate to a seating surface of the seat assembly and configured to generate an electrode signal having a signal value dependent on an excitation signal applied to the first electrode and a proximity of the occupant, and a second electrode distinct from the first electrode, said second electrode configured to be installed into the seat assembly and configured to generate an electrode signal having a signal value dependent on an excitation signal applied to the second electrode and the proximity of the occupant. The controller is configured to determine an occupant presence based on signal values arising from a high frequency excitation signal and a low frequency excitation signal being applied to two or more of a) only the first electrode, b) only the second electrode, and c) simultaneously both the first electrode and the second electrode.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
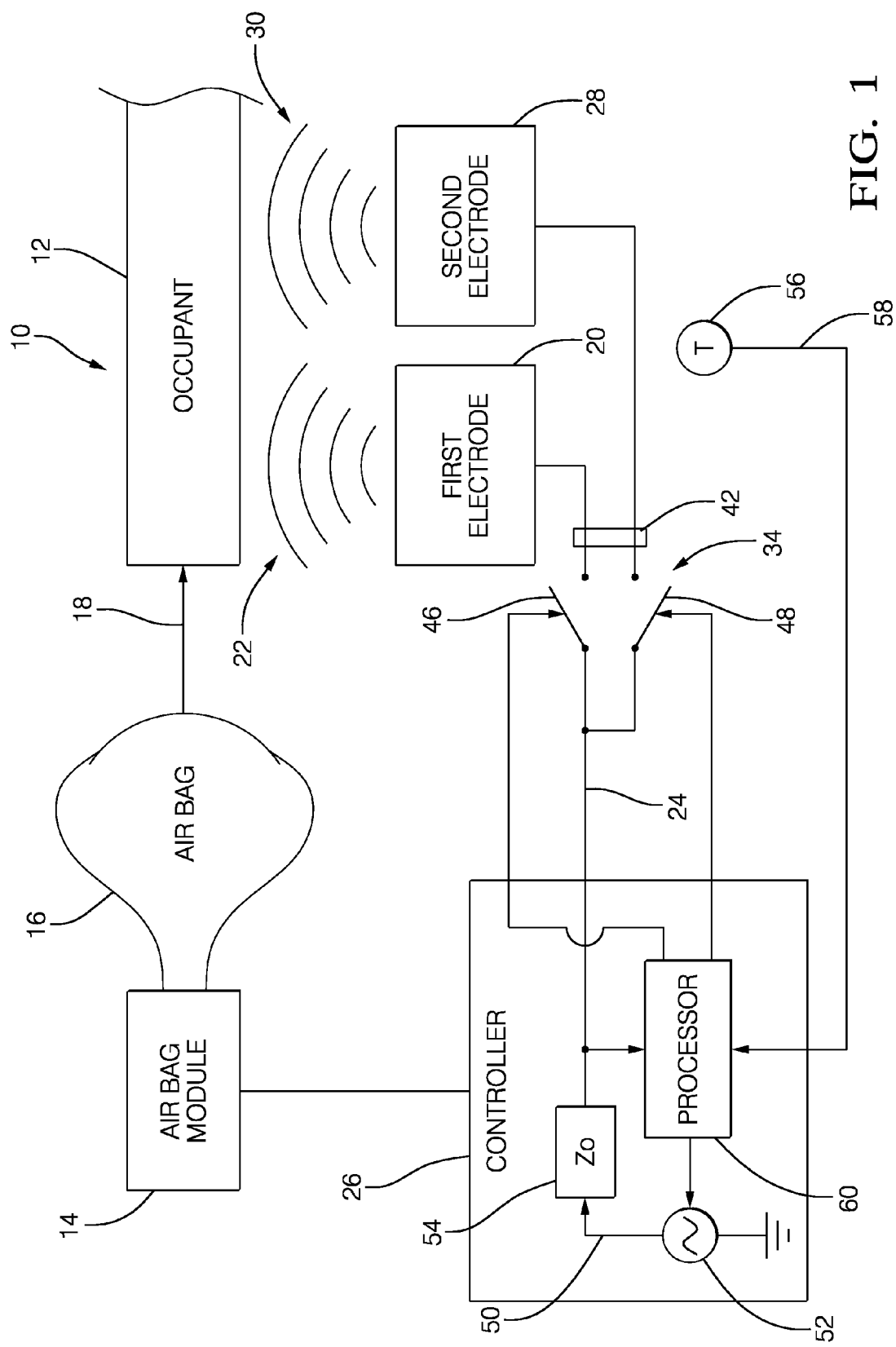
FIG. 1 is a diagram of an occupant detection system in accordance with one embodiment.
Figure 2:
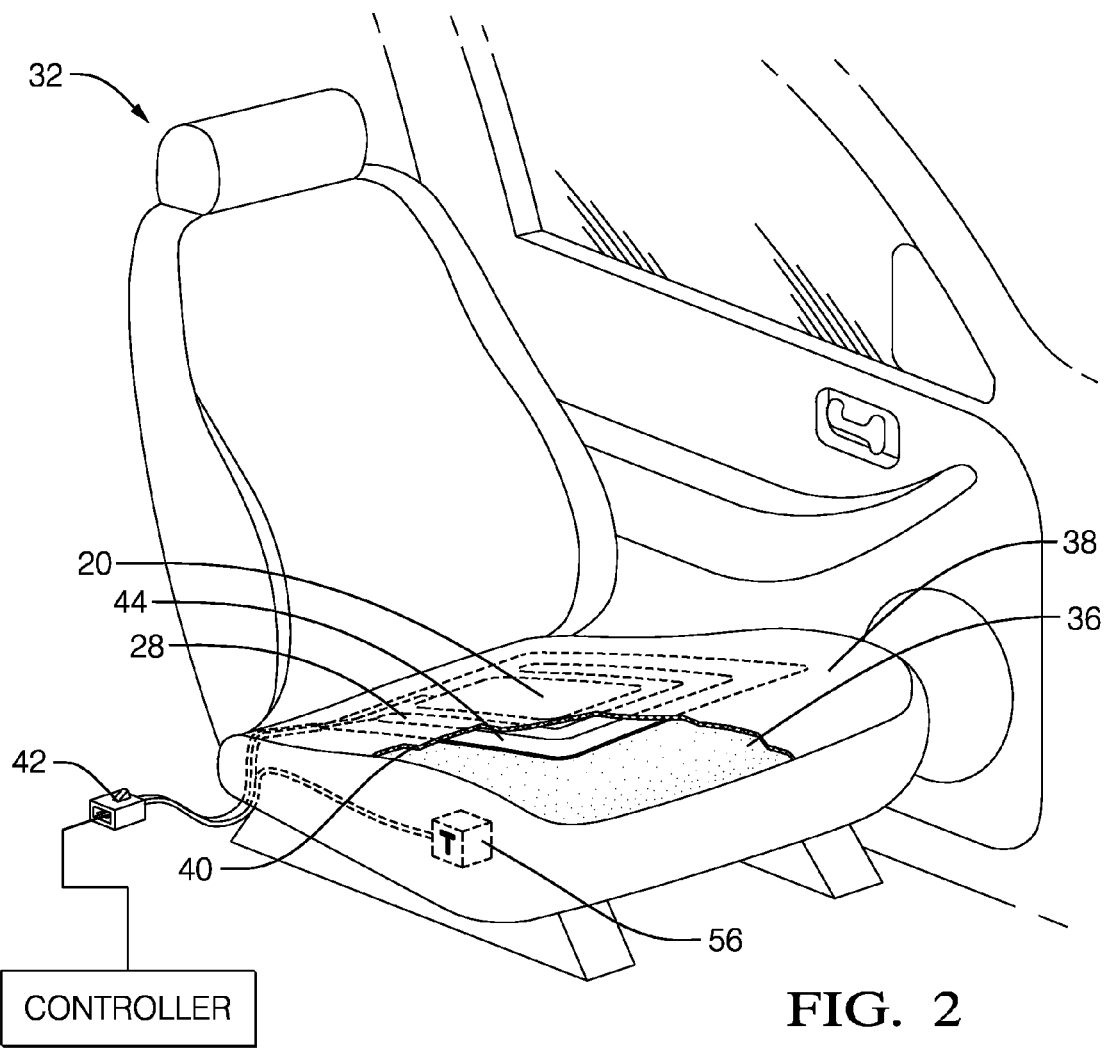
FIG. 2 is a perspective view of a seat assembly useful in conjunction with the system of FIG. 1 in accordance with one embodiment.

FIG. 1 illustrates a non-limiting example of a dual electrode occupant detection system or system 10 for determining an occupant presence for an occupant 12 on a seat assembly 32 (FIG. 2). The occupant 12 may be an adult or an infant in a child seat residing on the seat assembly 32. Determining an occupant presence on the seat assembly 32 may include characterizing the occupant (e.g., adult versus infant) for enabling or disabling an air bag module 14 or other passenger protection devices in the vehicle. In general, the air bag module 14 deploys an air bag 16 toward the occupant 12 as indicated by an arrow 18 to restrain or protect the occupant 12 in the event of a vehicle collision. It may be advantageous to for air bag module 14 to disable deployment of the airbag 16 if the seat assembly 32 is empty, or if the seat assembly 32 is occupied by an infant in a child seat, so that the air bag 16 is not unnecessarily or undesirably deployed.

As will be explained in more detail below, the system 10 includes a first electrode 20 that generates a first electric field 22 and contributes to an electrode signal 24 in response to an excitation signal 50 output by a controller 26. The system 10 also includes, and a second electrode 28 that generates a second electric field 30 and also contributes to the electrode signal 24. The emission of the first electric field 22 and the second electric field 30 is determined by the state of a switch device 34 that can selectively couple a) only the first electrode 20 to the controller 26, or b) only the second electrode 28 to the controller 26, or c) simultaneously both the first electrode 20 and the second electrode 28, or d) neither the first electrode 20 nor the second electrode 28. In one embodiment, the switch device 34 generally includes a first switch 46 and a second switch 48. The two switches may be any of several components known to those in the art such as transistors or relays that receive control signals from the controller 26 in order to operate each switch to a closed state or an open state. The switch device 34 is illustrated as being outside of the controller 26 only for the purpose of explanation. It is recognized that the switch device 34 may be integrated into the controller 26.

By way of example and not limitation, the excitation signal 50 may be output by a signal generator 52, and the electrode signal 24 may be characterized as being proportional to the excitation signal 50 because a voltage divider network is formed by the electrodes coupled via the switch device 34, and a reference impedance 54. It is recognized that other means for generating the electrode signal 24 are known. The electrode signal 24 arising in response to the controller 26 outputting an excitation signal 50 for any combination of these switch states can be characterized as having a signal value such as a signal amplitude or signal phase that may be dependent on, but not limited to: characteristics of the excitation signal 50 output by the controller, the proximity of the occupant 12, environmental convictions such as temperature and/or humidity, and the size, shape, and location of the first electrode 20 and the second electrode 28. As will be explained in more detail below, by determining and comparing a plurality signal values for a plurality of distinct combinations of switch states of the switch device 34, variations of the signal values caused by variations in environmental conditions such as humidity and temperature can be learned, and so the ability of the system 10 to accurately and reliably determine the presence of the occupant 12 is less affected by variations of environmental conditions. However, it has been observed that more consistent occupancy determinations may be available if the system 10 includes a thermistor 56 so that the controller can compensate the electrode signal 24 based on a temperature signal 58 from the thermistor 56.

FIG. 2 illustrates a non-limiting example of the seat assembly 32 suitable for use by the system 10 to determine the presence of the occupant 12 (not shown in FIG. 2) on or near the seat assembly 32. The seat assembly 32 is illustrated in a vehicle passenger compartment, but could be used in any kind of vehicle, such as an airplane or construction equipment. The seat assembly 32 typically has a seat cushion 36 for providing a seating surface 38 to support the occupant 12. Seat cushion 36 is suitably made of foam having characteristics suitable for seating use. The seat cushion 36 is covered with covering 40 to protect the seat cushion 36 and the electrodes 20, 28, and to make the appearance of seat assembly 32 attractive. A mat 44 (FIG. 3) adjacent to the seating surface 38 (FIG. 3) may be provided as a carrier for the first electrode 20 and the second electrode 28 to simplify manufacturing of the seat assembly 32. The seat assembly 32 may include the thermistor 56 so that the excitation signal 50 can be compensated for temperature of the seat cushion 36.

Figure 3:
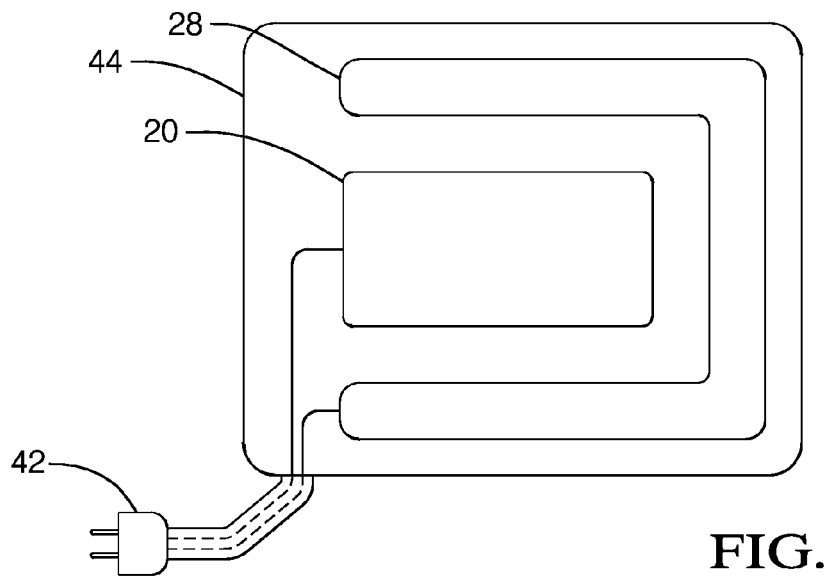
FIG. 3 is a top view of a mat useful for installation into the seat assembly of FIG. 2 in accordance with one embodiment.

FIG. 3 illustrates a non-limiting example of the mat 44 with the first electrode 20 and the second electrode 28 arranged on the mat 44. The electrodes 20, 28 may be made of a variety of electrically conductive materials suitable for use adjacent to the seating surface 38. Exemplary materials for forming the electrodes include metal foil, metal wire, conductive fiber, conductive ink, and metal ribbon. In general, the first electrode 20 may be characterized as having a first electrode area defined by the perimeter of the first electrode 20. Similarly, the second electrode 28 may characterized as having a second electrode area defined by the perimeter of the second electrode 28. The relative areas of the electrodes 20, 28 influence the signal values arising from each of the electrodes. Also, the locations of the electrodes relative the occupant also influence the signal values arising from each of the electrodes. The mat 44 may also include a connector 42 to simplify making an electrical connection to the switch device 34 or the controller 26.

As suggested in FIG. 1, the occupant 12 may not directly or entirely overlay all of the area defined by the second electrodes 28, and so the contribution to the signal value of the electrode signal 24 by the second electrode 28 may exhibit a greater influence caused by variations of environmental conditions when compared to the contribution to the signal value of the electrode signal 24 by the first electrode 20. For example, the first electrode 20 may be configured to occupy a central portion of the seating surface so that, for example, a typical small adult would cover the entire first electrode when residing on the seating surface 38. In contrast, the second electrode 28 may be configured to occupy at least part of a perimeter portion of the seating surface so that even a typical large adult would not cover the entire second electrode when residing on the seating surface 38. Moreover, some child seats are constructed so that they contact the seating surface 38 predominately over the second electrode 28, or solely over the first electrode 20. In other words, various child seats tend to load either outside the center portion or solely within the center portion dependent on the construction of the child seat.

In this non-limiting example, the first electrode 20 and the second electrode 28 are illustrated as being coplanar and non-overlapping. However, it is contemplated that another electrode such as having all or part of the first electrode overlying the second electrode, or having the second electrode further removed from the seating surface 38, may cause the electrode signal 24 to exhibit trends that further help to discriminate the influence on the electrode signal 24 by the size of the occupant from influences caused by variation in environmental conditions. Whatever configuration is used for the first electrode 20 and the second electrode 28, it is preferably that the electrodes exhibit different sensitivities to variations in environmental conditions such as humidity. By providing distinct electrodes with distinct sensitivities, the overall effects caused by variations in humidity can be compensated for in order to more reliably and more accurately determine occupant presence than occupant detection systems that do not variously select or combine electrodes to provide distinct electrode signal values.

Referring again to FIG. 1, the controller 26 may include a processor 60 such as a microprocessor or other control circuitry as should be evident to those in the art. The controller 26 may include memory, including non-volatile memory, such as electrically erasable programmable read-only memory (EEPROM) for storing one or more routines, thresholds and captured data. The one or more routines may be executed by the processor 60 to perform steps for outputting control signals to the switch device 34 and determining occupant presence based on the signal values of the electrode signal 24 detected by the controller 26 as described herein. For example, the controller 26 may be configured to determine an occupant presence based on signal values arising from a high frequency excitation signal and a low frequency excitation signal being applied to two or more of a) only the first electrode 20, b) only the second electrode 28, and c) simultaneously both the first electrode 20 and the second electrode 28. By way of example and not limitation, a suitable low frequency excitation signal may have a frequency of two thousand Hertz (2 kHz), and a suitable high frequency excitation signal may have a frequency of fifty thousand Hertz (50 kHz). It has been observed that electrode signals arising from excitation signals having different frequencies exhibit different sensitivities to environmental conditions. As such using multiple frequencies may also be advantageous to compensate for variations in environmental conditions such as humidity.

Figure 4:
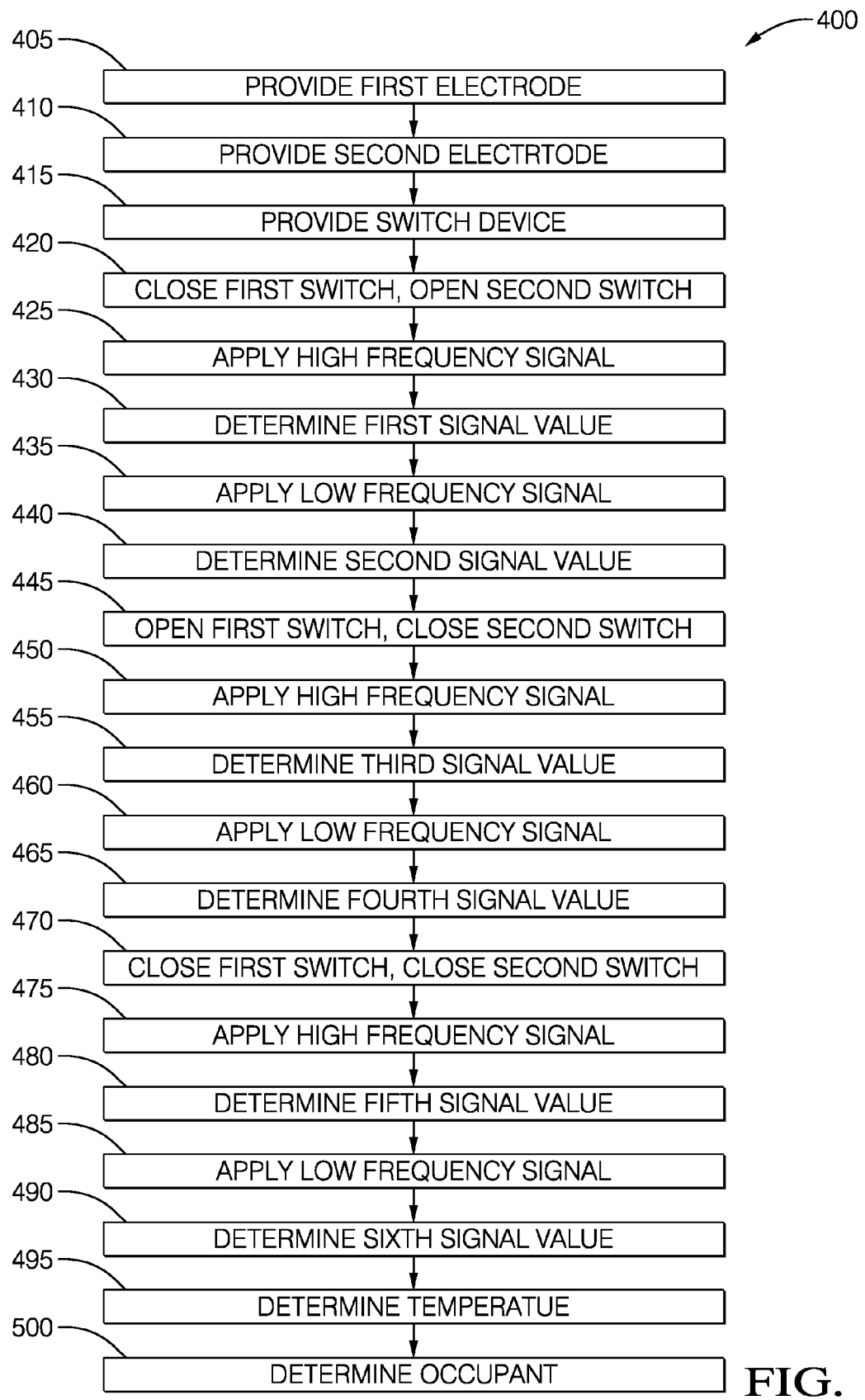
FIG. 4 is a flowchart of a method performed by the system of FIG. 1 in accordance with one embodiment.

FIG. 4 illustrates a non-liming example of a method 400 of detecting an occupant presence of the occupant 12 on the seat assembly 32. In general, the method 400 applies a high frequency excitation signal and a low frequency excitation signal selectively to two or more of a) only the first electrode 20, b) only the second electrode 28, and c) simultaneously both the first electrode 20 and the second electrode 28, and then determines an occupant presence based on signal values of the electrode signal 24 arising from the various combination of excitation frequency and electrode selection.

Step 405, PROVIDE FIRST ELECTRODE, may include providing a first electrode 20 configured to be installed into a seat assembly 32 proximate to a seating surface 38 of the seat assembly 32 and configured to generate an electrode signal 24 having a signal value dependent on an excitation signal 50 applied to the first electrode 20 by the controller, a proximity of the occupant 12, and an environmental condition such as humidity.

Step 410, PROVIDE SECOND ELECTRTODE, may include providing a second electrode 28 distinct from the first electrode 20, said second electrode 28 configured to be installed into the seat assembly 32 and configured to generate an electrode signal 24 having a signal value dependent on an excitation signal 50 applied to the second electrode 28 by the controller 26, the proximity of the occupant 12, and the environmental condition. Preferably the sensitivity of the signal value to the environmental condition is different for the first electrode 20 and the second electrode 28.

Step 415, PROVIDE SWITCH DEVICE, may include providing a switch device 34 configured to selective couple a) only the first electrode 20 to the controller 26, b) only the second electrode 28 to the controller 26, or c) simultaneously both the first electrode 20 and the second electrode 28 to the controller 26. By way of example and not limitation, the switch device 34 may include a first switch 46 configured to selectively connect or disconnect the first electrode 20 to or from the controller 26, and a second switch 48 configured to selectively connect or disconnect the second electrode 28 to or from the controller 26. The first switch 46 and the second switch 48 would typically be configured to receive control signals from controller 26 in order to independently operate each switch to either a closed state or an open state.

Step 420, CLOSE FIRST SWITCH, OPEN SECOND SWITCH, may include the controller 26 outputting appropriate control signals to the first switch 46 and the second switch 48.

Step 425, APPLY HIGH FREQUENCY SIGNAL, may include the controller 26 generating a high frequency excitation signal, 50 kHz for example, and coupling that excitation signal to the first switch 46 via a reference impedance (not shown). The reference impedance and the electrodes form an electrical network that provides the electrode signal 24 in response to the excitation signal 50 from the controller 26. How a reference impedance such as a capacitor is uses as part of an occupant detection system is described in U.S. Pat. No. 7,876,106 issued to Hansen et al. Jan. 25, 2011, and elsewhere in the prior art.

Step 430, DETERMINE FIRST SIGNAL VALUE, may include determining a first signal value of the electrode signal arising from the high frequency excitation signal being applied to only the first electrode. The signal value may be, but is not limited to, a signal amplitude or signal phase of the electrode signal, possible relative to a similar value of the excitation signal 50.

Step 435, APPLY LOW FREQUENCY SIGNAL, may include, may include the controller 26 generating a low frequency excitation signal, 2 kHz for example, and coupling that excitation signal to the first switch 46.

Step 440, DETERMINE SECOND SIGNAL VALUE, may include determining a second signal value of the electrode signal 24 arising from the low frequency excitation signal being applied to only the first electrode. As with the first signal value, the signal value may be, but is not limited to, a signal amplitude or signal phase of the electrode signal, possible relative to a similar value of the excitation signal 50.

Step 445, OPEN FIRST SWITCH, CLOSE SECOND SWITCH, is comparable to step 420 and may include the controller 26 outputting appropriate control signals to the first switch 46 and the second switch 48.

Step 450, APPLY HIGH FREQUENCY SIGNAL; step 455, DETERMINE THIRD SIGNAL VALUE; step 460, APPLY LOW FREQUENCY SIGNAL; and step 465, DETERMINE FOURTH SIGNAL VALUE, are comparable to steps 425, 430, 435, and 440 respectively in that they apply similar excitation signals and determine or measure comparable electrode signals.

It has been observed during testing that four (4) electrode signals for four distinct combinations of high and low frequency with two different switch device states are sufficient to reliably determine occupant type. It has also been observed that the two low frequency electrode signal values provide a greater indication of environment than the high frequency electrode signals, and that the high frequency values are more responsive or sensitive to occupant presence. However, testing of several seat assembly configurations and part-to-part variability suggest that the system 10 more reliably determines an occupant with all four signals. If testing indicates that the system 10 is sufficiently reliable with four electrode signals, then the method 400 may skip to Step 495 and not determine a fifth or sixth signal. However, some testing has indicated that occupant detection may be more reliable on some configurations if six electrode signals are used to determine an occupant, and so the method 400 may execute all the steps shown in the flowchart.

Step 470, CLOSE FIRST SWITCH, CLOSE SECOND SWITCH, is comparable to step 420 and may include the controller 26 outputting appropriate control signals to the first switch 46 and the second switch 48.

Step 475, APPLY HIGH FREQUENCY SIGNAL; step 480, DETERMINE FIFTH SIGNAL VALUE; step 485, APPLY LOW FREQUENCY SIGNAL; and step 490, DETERMINE SIXTH SIGNAL VALUE, are comparable to steps 425, 430, 435, and 440 respectively in that they apply similar excitation signals and determine or measure comparable electrode signals.

Step 495, DETERMINE TEMPERATURE, is an optional step that may include determining temperature proximate to the first electrode and the second electrode if testing indicates that compensating for temperature is desired or required to meet system performance objectives. Compensating the electrode signals for temperature may be by way of look-up table or formula, typically determined by empirical testing; see the description for FIGS. 5 and 6 below.

Step 500, DETERMINE OCCUPANT, may include determining an occupant presence based on signal values arising from the excitation signal 50 being applied to either or both of the electrodes. This may include the controller 26 or the processor 60 further processing the first signal value (Step 430), the second signal value (Step 440), the third signal value (Step 455), and the fourth signal value (Step 465) if four electrode signals are determined. If six electrode signals are determined, the fifth signal value (Step 480) and the sixth signal value (Step 490) may also be included in the further processing. Further processing may include arithmetic averaging, root-mean-square averaging, or other known algorithms for combining multiple data values, optionally with an algorithm to reduce any effects of signal noise.

Figure 5:
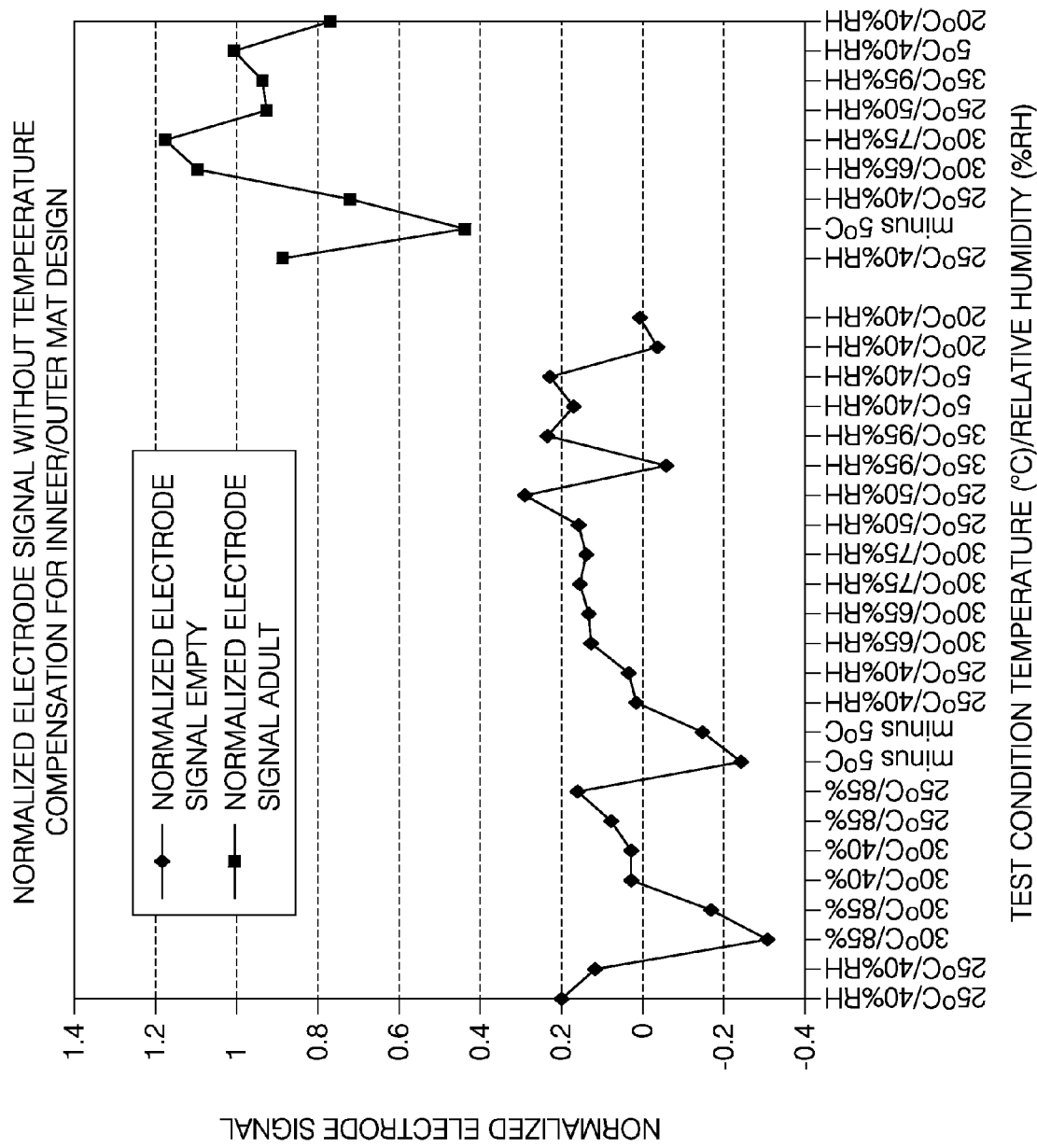
FIG. 5 is a graphical illustration of signal values present in the system of FIG. 1 for various conditions without temperature compensation.
Figure 6:
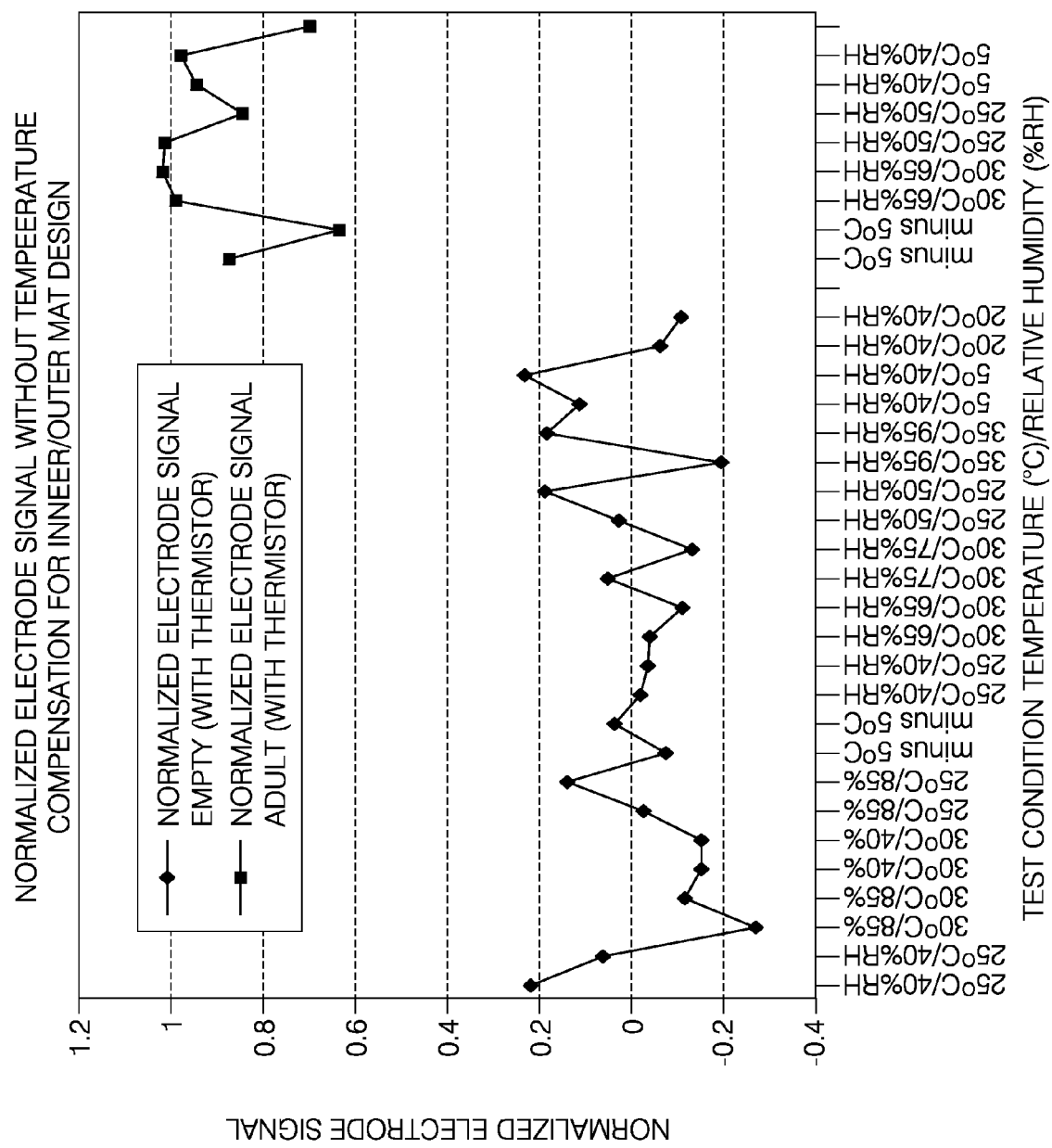
FIG. 6 is a graphical illustration of signal values present in the system of FIG. 1 for various conditions with temperature compensation.

FIGS. 5 and 6 illustrate non-limiting examples of test data where four signal values were averaged for each data point on the graph, and each data point represents a different temperature and relative humidity. For example, the first data point on FIG. 5 is the arithmetic average of the first signal value (Step 430), the second signal value (Step 440), the third signal value (Step 455), and the fourth signal value (Step 465) taken while the temperature proximate to the first electrode 20 and the second electrode 28 is twenty-five degrees Celsius (25° C.) and the relative humidity is forty percent (40% RH). The first group of data (i.e. the first twenty-four data points) is taken when the seat assembly 32 is empty, and the second group of data (the last nine data points) is when the seat assembly is occupied by a typical adult. Comparing FIG. 5 to FIG. 6, it appears that the readings are more consistent when temperature compensation is applied. However, it is recognized that such data will differ for different seat assembly designs and electrode configurations, and so such testing to determine if temperature compensation is warranted would be need on a case-by-case basis. Furthermore, it is recognized that the reliability of determining an occupant with four, or six, or some other number of electrode values would also need to be determined on a case-by-case basis.

Accordingly, a dual electrode occupant detection system (the system 10), a controller 26 for the system 10, and a method 400 of detecting an occupant presence on a seat assembly is provided. Two co-planar sensing areas (the first electrode 20 and the second electrode 28) are provided to provide inner and outer sensing areas. Each sensing area may provide unique frequency responses that may or may not benefit from temperature compensation. Such a configuration is advantageous as space between the electrodes 20, 28 may be occupied by a seat heater element, and so the added expense and complication of electrode arrangements that rely on an underlying shield layer, and the necessary additional electronics to drive that shield layer, can be avoided. Furthermore, such an arrangement eliminates variation due to misalignment of the shield and sensing layers.

While this invention has been described in terms of the preferred embodiments thereof, it is not intended to be so limited, but rather only to the extent set forth in the claims that follow.

We claim:
1. A dual electrode occupant detection system configured to determine an occupant presence on a seat assembly, said system comprising:
   a first electrode configured to be installed into a seat assembly proximate to a seating surface of the seat assembly, said first electrode configured to generate an electrode signal having a signal value dependent on an excitation signal applied to the first electrode and a proximity of the occupant;
   a second electrode distinct from the first electrode, said second electrode configured to be installed into the seat assembly and configured to generate an electrode signal having a signal value dependent on an excitation signal applied to the second electrode and the proximity of the occupant; and
   a controller configured to determine an occupant presence based on signal values arising from a high frequency excitation signal and a low frequency excitation signal being applied to two or more of a) only the first electrode, b) only the second electrode, and c) simultaneously both the first electrode and the second electrode, wherein the controller is configured to determine occupant presence based on
   a first signal value arising from a high frequency excitation signal being applied to only the first electrode,
   a second signal value arising from a low frequency excitation signal being applied to only the first electrode,
   a third signal value arising from the high frequency excitation signal being applied to one of only the second electrode, and simultaneously to both the first electrode and the second electrode,
   a fourth signal value arising from the low frequency excitation signal being applied to one of only the second electrode, and simultaneously to both the first electrode and the second electrode.

2. The system in accordance with claim 1, wherein the second electrode is coplanar with the first electrode.

3. The system in accordance with claim 1, wherein the controller is configured to selectively apply the high frequency excitation signal and the low frequency excitation signal to a) only the first electrode, b) only the second electrode, and c) simultaneously both the first electrode and the second electrode.

4. The system in accordance with claim 1, wherein
   the third signal value arises from the high frequency excitation signal being applied to only the second electrode,
   the fourth signal value arises from the low frequency excitation signal being applied to only the second electrode,
   wherein the controller is further configured to determine occupant presence based on
   a fifth signal value arising from the high frequency excitation signal being applied simultaneously to both the first electrode and the second electrode, and
   a sixth value arising from the low frequency excitation signal being applied simultaneously to both the first electrode and the second electrode.

5. The system in accordance with claim 1, wherein the first electrode is configured to be installed proximate to a central portion of the seating surface, and the second electrode is configured to be installed proximate to at least part of a perimeter portion of the seating surface.

6. The system in accordance with claim 1, wherein the low frequency excitation signal has a frequency of two thousand Hertz (2 kHz), and the high frequency excitation signal has a frequency of fifty thousand Hertz (50 kHz).

7. The system in accordance with claim 1, wherein the system further comprises a switch device configured to selective couple a) only the first electrode to the controller, b) only the second electrode to the controller, or c) simultaneously both the first electrode and the second electrode to the controller.

8. The system in accordance with claim 1, wherein the system further comprises a thermistor configured to detect a temperature proximate to the first electrode and the second electrode.

9. The system in accordance with claim 1, wherein the system further comprises a seat assembly.

10. A method of detecting an occupant presence on a seat assembly, said method comprising:
    providing a first electrode configured to be installed into a seat assembly proximate to a seating surface of the seat assembly and configured to generate an electrode signal having a signal value dependent on an excitation signal applied to the first electrode and a proximity of the occupant;
    providing a second electrode distinct from the first electrode, said second electrode configured to be installed into the seat assembly and configured to generate an electrode signal having a signal value dependent on an excitation signal applied to the second electrode and the proximity of the occupant;
    applying a high frequency excitation signal and a low frequency excitation signal selectively to two or more of a) only the first electrode, b) only the second electrode, and c) simultaneously both the first electrode and the second electrode; and
    determining an occupant presence based on signal values arising from the excitation signals being applied to the electrodes, wherein determining an occupant presence includes the steps of
    determining a first signal value arising from a high frequency excitation signal being applied to only the first electrode,
    determining a second signal value arising from a low frequency excitation signal being applied to only the first electrode,
    determining a third signal value arising from the high frequency excitation signal being applied to one of only the second electrode, and simultaneously to both the first electrode and the second electrode,
    determining a fourth signal value arising from the low frequency excitation signal being applied to one of only the second electrode, and simultaneously to both the first electrode and the second electrode.

11. The method in accordance with claim 10, wherein
    the third signal value arises from the high frequency excitation signal being applied to only the second electrode,
    the fourth signal value arises from the low frequency excitation signal being applied to only the second electrode,
    wherein determining an occupant presence further includes determining a fifth signal value arising from the high frequency excitation signal being applied simultaneously to both the first electrode and the second electrode, and
determining a sixth value arising from the low frequency excitation signal being applied simultaneously to both the first electrode and the second electrode.

12. The method in accordance with claim 10, wherein the method further comprises
    determining a temperature value based on a temperature proximate to the first electrode and the second electrode, wherein determining an occupant presence is further based on the temperature.

13. A controller for a dual electrode occupant detection system configured to determine an occupant presence on a seat assembly, said system comprising a first electrode configured to be installed into a seat assembly proximate to a seating surface of the seat assembly and configured to generate an electrode signal having a signal value dependent on an excitation signal applied to the first electrode and a proximity of the occupant, and a second electrode distinct from the first electrode, said second electrode configured to be installed into the seat assembly and configured to generate an electrode signal having a signal value dependent on an excitation signal applied to the second electrode and the proximity of the occupant, said controller configured to determine an occupant presence based on signal values arising from a high frequency excitation signal and a low frequency excitation signal being applied to two or more of a) only the first electrode, b) only the second electrode, and c) simultaneously both the first electrode and the second electrode, wherein the controller is configured to determine occupant presence based on
    a first signal value arising from a high frequency excitation signal being applied to only the first electrode,
    a second signal value arising from a low frequency excitation signal being applied to only the first electrode,
    a third signal value arising from the high frequency excitation signal being applied to one of only the second electrode, and simultaneously to both the first electrode and the second electrode,
    a fourth signal value arising from the low frequency excitation signal being applied to one of only the second electrode, and simultaneously to both the first electrode and the second electrode.

14. The controller in accordance with claim 13, wherein the controller is configured to selectively apply the high frequency excitation signal and the low frequency excitation signal to a) only the first electrode, b) only the second electrode, and c) simultaneously both the first electrode and the second electrode.

15. The controller in accordance with claim 13, wherein the controller further comprises a switch device configured to selective couple a) only the first electrode to the controller, b) only the second electrode to the controller, or c) simultaneously both the first electrode and the second electrode to the controller.

16. The controller in accordance with claim 13, wherein the controller is further configured to receive a temperature signal and determine an occupant presence further based on the temperature signal.

* * * * *